(12) United States Patent
Barrett et al.

(10) Patent No.: US 10,482,179 B2
(45) Date of Patent: Nov. 19, 2019

(54) REQUIREMENT DOCUMENT LANGUAGE QUALITY FEEDBACK AND IMPROVEMENT

(71) Applicant: Raytheon Company, Waltham, MA (US)

(72) Inventors: Nicholas Wayne Barrett, Oro Valley, AZ (US); Kimberly Kukurba, Tucson, AZ (US); Daniel H. Millet, Sahuarita, AZ (US); Randall J. Ramsey, Marana, AZ (US); George L. Ball, Tucson, AZ (US); Abraham Wu, Tucson, AZ (US); Blaine K. Boule, Vail, AZ (US)

(73) Assignee: Raytheon Company, Waltham, MA (US)

(*) Notice: Subject to any disclaimer, the term of this patent is extended or adjusted under 35 U.S.C. 154(b) by 51 days.

(21) Appl. No.: 15/728,041

(22) Filed: Oct. 9, 2017

(65) Prior Publication Data
US 2019/0108219 A1    Apr. 11, 2019

(51) Int. Cl.
| G06F 17/00 | (2019.01) |
| G10L 15/00 | (2013.01) |
| G10L 15/22 | (2006.01) |
| G06F 17/27 | (2006.01) |

(52) U.S. Cl.
CPC ........ G06F 17/2785 (2013.01); G06F 17/274 (2013.01)

(58) Field of Classification Search
CPC combination set(s) only.
See application file for complete search history.

(56) References Cited

U.S. PATENT DOCUMENTS

| 8,402,030 B1 | 3/2013 | Pyle et al. |
| 9,727,561 B1* | 8/2017 | Ko .......................... G06F 16/93 |
| 9,787,838 B1* | 10/2017 | Lembersky ......... H04M 3/5175 |
| 2015/0235281 A1* | 8/2015 | Jain ................... G06Q 30/0282 |
| | | 705/347 |

OTHER PUBLICATIONS

Grady, Jeffrey, "Section 8.4.3.1 "Requirements Set Quality Attributes" and Section 8.4.3.2 "Individual Requirements Attributes"", System Requirements Analysis, Elsevier, (2014), 719-720.
Wilson, William, et al., "Automated Analysis of Requirement Specifications", Proceedings of the 19th international conference on Software engineering., (1997), 161-171.

* cited by examiner

*Primary Examiner* — Shreyans A Patel
(74) *Attorney, Agent, or Firm* — Schwegman Lundberg & Woessner, P.A.

(57) ABSTRACT

A device for locating words and/or phrases in a requirement statement that cause confusion can include one or more memory devices including data defining words and/or phrases and corresponding, respective deductions for each of the words and/or phrases and processing circuitry to: receive the requirement statement that specifies requirements for a product or service, determine a count of each of the words and/or phrases that are in the requirement statement and the one or more memory devices and a location of the words and/or phrases in the requirement statement, determine a score for the requirement statement based on a maximum allowable score in the one or more memory devices, the determined count, and the deductions, and generate a report indicating the score and the location of the words and/or phrases that reduced the maximum allowable score, the score indicating the quality of the requirement document.

20 Claims, 5 Drawing Sheets

REPORT 102A

REQUIREMENT DOCUMENT SECTION

ANNOTATED REQUIREMENT DOCUMENT SECTION

| CATEGORY | WORD/PHRASE/GRADE LEVEL/WORD COUNT | COUNT | DEDUCTION |
|---|---|---|---|
| IMPERATIVE | MAY | 2 | 10.2 |
| | CAN | 1 | 5.1 |
| | SHALL | 12 | 0 |
| WEAK PHRASE | MAY | 1 | 7 |
| | ABLE | 1 | 5 |
| CONTINUANCE | FOLLOWING | 1 | 4 |
| READABILITY | GRADE 12 | 1 | 10 |
| SIZE | [3, 40] | [1, 1] | [20, 15] |

SCORE 82.77

*FIG. 2*

| WORD/PHRASE | CATEGORY | | PART OF SPEECH | WEIGHT |
|---|---|---|---|---|
| MAY | IMPERATIVE | | MODAL | 10 |
| | OPTION | | NOT MODAL & NOT NOUN | 7 |
| | N/A | | NOUN | 0 |
| ... | | | | |

| VALUE NAME | VALUE |
|---|---|
| THRESHOLD NUMBER OF DIRECTIVES | 3 |
| THRESHOLD RATIO OF CONTINUANCES TO IMPERATIVES | 1:1 |
| MINIMUM WORD THRESHOLD | 5 |
| MAXIMUM WORD THRESHOLD | 25 |
| MAXIMUM GRADE LEVEL | 11 |
| MAXIMUM ALLOWABLE SCORE | 100 |
| THRESHOLD NUMBER OF CONJUNCTIONS | 1 |

FIG. 3

REQUIREMENT DOCUMENT LANGUAGE QUALITY FEEDBACK AND IMPROVEMENT

TECHNICAL FIELD

Embodiments discussed herein regard devices, systems, and methods for determining whether a written requirement is of sufficient quality.

BACKGROUND

Tools exist for spell-checking, proofreading, and/or plagiarism detection. These tools operate to determine whether language in a document violate certain grammar. Such rules are not necessarily pertinent to requirement documents. A requirement document specifies rules to be followed in building, designing, or otherwise satisfying a product or service description.

Unfortunately, not all requirement statements of requirement documents are clear and/or concise. Some language in a requirement document can create ambiguity, thus an entity trying to satisfy the specification of the requirement document is left to guess. This ambiguity or lack of clarity creates issues in delivered products and can account for certain product defects.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 2 illustrates, by way of example, a diagram of an embodiment of a report, such as can be provided by the output circuitry illustrated in FIG. 1.

FIG. 3 illustrates, by way of example, a diagram of an embodiment of contents of a memory.

DETAILED DESCRIPTION

Figure 1:
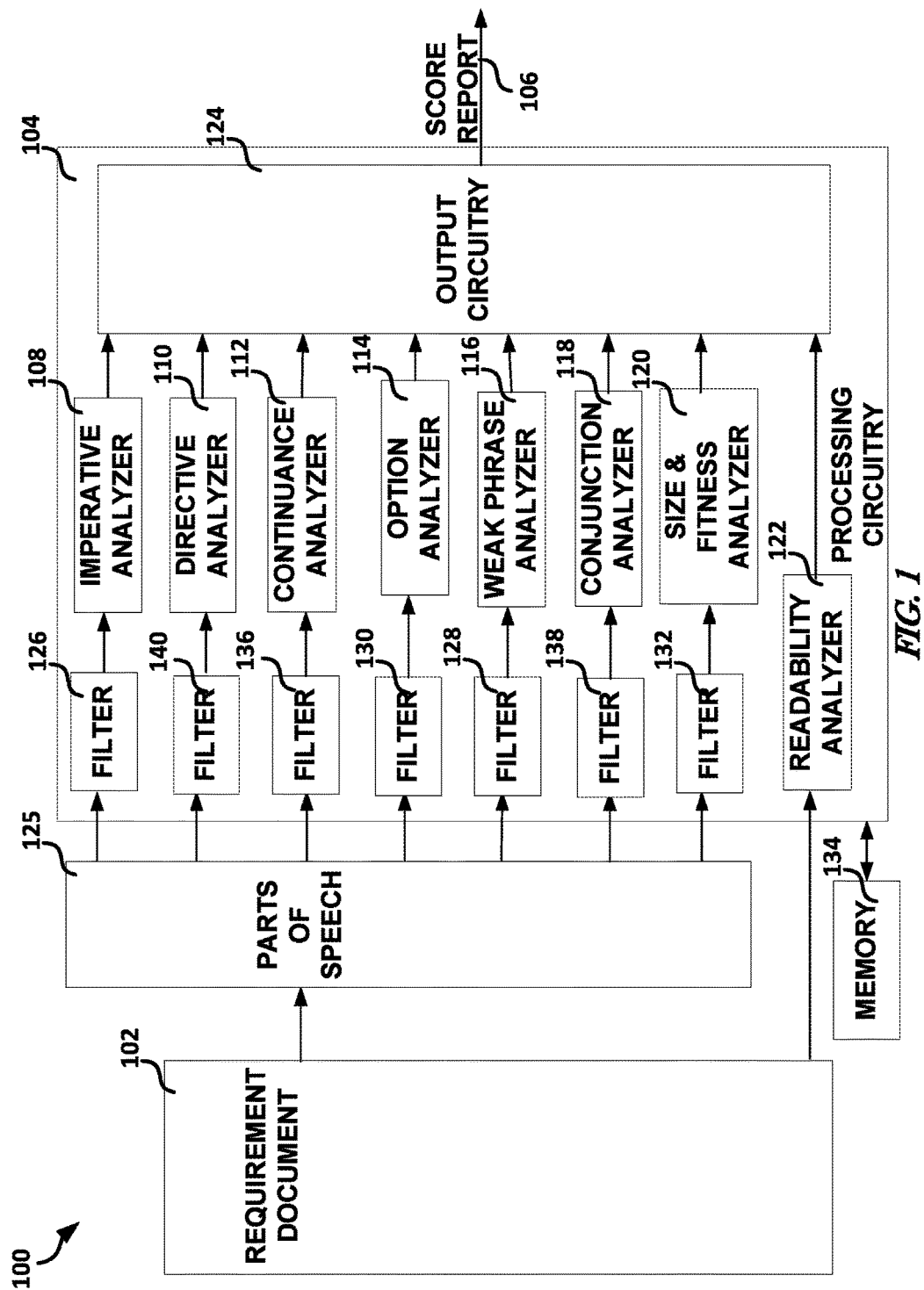
FIG. 1 illustrates, by way of example, a diagram of an embodiment of a system.

Embodiments generally relate to determining whether a requirement statement is sufficiently clear, concise, and/or otherwise specific. The clarity, conciseness, and/or specificity can be provided as a score. The score can be used to determine whether, which, and/or where revisions to the requirement statement will help increase the clarity of the requirement statement. In one or more embodiments, a report may be provided indicating, specifically, a word, paragraph, section, or the like, of the requirement statement that can be changed to help increase the clarity of the requirement statement.

Embodiments can consider a number, ratio, or the like, of a category of words, such as imperatives, directives, continuances, options, weak phrases, conjunctions, size and/or fitness indicators, and/or readability, among others, of a requirements statement. A requirement document comprises one or more requirements statements that detail conditions to be satisfied in performing a service, such as producing a product, or in a product to be created. Embodiments can consider a number and/or ratio of occurrences of words/phrases in each of the categories in the requirements document and determine a score based on the determined number and/or ratio. Embodiments can track where, in the requirements document, words or phrases that caused a deduction in the score are located. The word, phrase and the locations of the word, phrase can be provided to a user. The user can then update the requirements document, such as to make the requirements document more clear, and have an updated score provided, such as in real time. The requirements document can be analyzed statement by statement, such as to create a score for each statement (e.g., subsection of the requirement document) and then combine the determined scores to determine a score for the document or a sub-section of the document. While the disclosure is generally phrased in terms of a requirement document, the disclosure can be implemented on a sub-section of the requirement document, sometimes called a requirement statement.

A continuance is a word or phrase, such as "below", "following", "listed", or the like, that introduce the specification of requirements at a different location in the requirement document. Generally, requirements with a greater number of continuances are more organized and structured. However, in some instances, extensive use of continuances can indicate very complex and detailed requirements specification statements.

A directive is a word and phrase, such as "example", "figure", "table", or the like, that point to illustrative information within the requirements document. A higher ratio of the total count of directives to the document's total lines appears to be an indicator of how precisely requirements are specified.

An imperative is a word or phrase, such as "shall", "must", "will", "should", or the like, indicating a strong command that something must be provided. A requirements document can be made more explicit (clear) if the majority of their imperative counts are associated with strong imperatives, such as "shall".

An option is a word or phrase, such as "can", "may", "possible", or the like, that loosen the requirements specified by the requirement document that give latitude in implementing a requirement. Options introduce risks to schedule and cost, as the final product is not under as much control.

A weak phrase is a word or phrase that introduce uncertainty into a requirement document, and thereby leaves room for multiple interpretations, either indicating the requirements are defined in detail elsewhere or leaving them open to subjective interpretation. Examples of weak phrases include, but are not limited to: "adequate", "applicable", "as appropriate", "be able to", "capable of", "effective", "as required", "easy to", "timely", "feasible".

A conjunction is a word that joins words or phrases together to create relationships. The presence of a single conjunction does not strengthen or weaken a specifications statement. However, the presence of multiple unique conjunctions (e.g., using both "and" and "or") in the same sentence can introduce confusion and uncertainty in a statement.

Size in the context of embodiments can include counts of one or more of three indicators: total lines of text, total number of imperative words and phrases, and the total number of subjects of specification statements. Ratios of imperatives to subjects and lines of text to imperatives provide indicators of how detailed the specification is, and how concise it is in specifying the requirements. Size in the context of some embodiments can include counts of a number of words in each sentence. Sentences that are too short tend not to convey information, and sentences that are too long tend to be confusing.

Readability statistics measure the ease with which an adult reader can comprehend a written document. In order to more successfully communicate requirements for complex, technical efforts, maintaining a high level of readability (e.g., a lower education level required to read and understand the document) can help ensure comprehension and understanding of the intent and scope of the requirement.

One or more of the following may be provided along with the score and/or the report indicating where words or phrases that may cause confusion or reduce clarity are located: (1) named entities; (2) syntax, (3) sentiment; (4) domain entities; and (5) unrecognized acronyms.

Named-entity recognition (NER) circuitry can be used to provide named entities. NER seeks to locate and classify named entities in text into pre-defined categories, such as the names of persons, organizations, locations, expressions of times, quantities, monetary values, and percentages.

Syntax can be provided using a parts of speech diagram. A parts of speech diagram illustrates a sentence structure by analyzing the parts of speech and syntax. Well-written requirement statements use concise, clear phrases and are characteristically seen as balanced syntax trees, such as with branches less than 5 levels deep.

Generally speaking, sentiment analysis aims to determine the attitude of a speaker or a writer with respect to some topic or the overall contextual polarity of a document. The attitude may be his or her judgment or evaluation (see appraisal theory), affective state (e.g., the emotional state of the author when writing), or the intended emotional communication (e.g., the emotional effect the author wishes to have on the reader).

The term "acronym" is the name for a word made from the first letters of each word in a series of words. An unrecognized acronym is one that is undefined in the requirements document.

FIG. 1 illustrates, by way of example, a diagram of an embodiment of a system 100. The system 100 as illustrated includes a requirement document 102 (or a sub-section of the requirement document) as an input to processing circuitry 104, which produces a score and/or report 106 as an output. The requirement document 102 specifies rules to be followed, expectations associated with an agreement between parties, or the like. For example, the requirement document 102 can provide details regarding expected functionality of a product, expected results from a service, steps to be taken in making a product or performing a service, or the like. In general, the requirement document 102 details expectations that an entity is to satisfy in satisfying their end of an agreement.

The processing circuitry 104 as illustrated includes an imperative analyzer 108, a directive analyzer 110, a continuance analyzer 112, an option analyzer 114, a weak phrase analyzer 116, a conjunction analyzer 118, a size and fitness analyzer 120, a readability analyzer 122, and output circuitry 124. The processing circuitry 104 analyzes content of the requirement document 102 and produces the score/report 106.

The imperative analyzer 108 searches the requirement document 102 for words or phrases that are defined, in a memory, as imperatives. Each occurrence of each imperative can be counted by the imperative analyzer 108. For each imperative determined to exist in the requirement document 102, the imperative analyzer 108 may determine a value to be deducted for the use of that imperative. For example, the imperative analyzer 108 can calculate a ratio of: a count of the number of occurrences of the imperative to a total word count of the requirement document. That ratio may be multiplied by a constant (e.g., one or more of a weight, a maximum allowable score, or a product of the weight and maximum allowable score). For example, if a maximum allowable score is 100, the following can be calculated for each imperative: weight*ratio*100. The numbers determined for each imperative may be summed. The result of the sum may be subtracted from the maximum allowable score as a deduction for using indefinite imperatives. In formula form (assuming the maximum allowable score is 100):

$$100 - \left( \sum_{imperative_1}^{imperative_n} Weight_{imperative_n} \left( \frac{imperative_n \text{ count}}{\text{total word count}} \right) * 100 \right)$$

For example, assume that the imperative "should" is counted two times and the imperative "shall" is counted one time in a requirement statement with a word count of fifty words. Assume that the imperative "should" has a weight of 10, the imperative "shall" has a weight of zero, and the maximum allowable score is 100. The imperative analyzer 108 can determine an imperative score of 60 (e.g., 100−10*2/50*100−0*1/50*100=60).

The directive analyzer 110 searches the requirement document 102 for words or phrases that are defined, in the memory 134, as directives. In one or more embodiments, the directive analyzer 110 determines a total number of directives in the requirement document 102. In one or more embodiments, the directive analyzer 110 assigns a maximum allowable score if the total number of directives is greater than (or equal to) a threshold number of directives. If the total number of directives is less than (or equal to) the threshold number of directives, the directive analyzer 110 can assign a number less than the maximum allowable score or "not applicable" ("n/a"). In assigning "n/a", the directive analyzer 110 does not punish the requirement document 102 for not containing a directive. Thus, in such embodiments, directives can only help, and not harm, the overall score. However, in some embodiments, the directive analyzer 110 can reduce the overall score.

The continuance analyzer 112 searches the requirement document 102 for words or phrases that are defined, in the memory 134, as continuances. Each occurrence of each continuance can be counted by the continuance analyzer 112. For each continuance determined to exist in the requirement document 102, the continuance analyzer 112 may determine a value to be deducted for the use of that continuance. For example, the continuance analyzer 112 can calculate a ratio of: a count of the number of occurrences of the continuance to a total word count of the requirement statement. That ratio may be multiplied by a constant (e.g., one or more of a weight, a maximum allowable score, or a product of the weight and maximum allowable score). For example, if a maximum allowable score is 100, the following can be calculated for each continuance: weight*ratio*100. The numbers determined for each continuance may be summed. The result of the sum may be subtracted from the maximum allowable score as a deduction for using problematic continuances. In formula form (assuming the maximum allowable score is 100):

$$100 - \left( \sum_{continuance_1}^{continuance_n} Weight_{continuance_n} \left( \frac{continuance_n \text{ count}}{\text{total word count}} \right) * 100 \right)$$

In one or more embodiments, continuances can be deducted only if one or more conditions are met. For example, a condition can include determining whether a ratio of a number of unique continuances to a number of unique imperatives is greater than a threshold ratio (e.g., 1 or other number). If the ratio is greater than (or equal to) the threshold ratio, a deduction can be calculated as described. If the ratio is less than (or equal to) the threshold ratio, no deductions may be made, thus not penalizing for using a continuance.

For example, consider a requirement statement that includes the continuances "following" and "below" and only one imperative, "shall". Assume that the continuance "following" is counted two times and the continuance "below" is counted one time in a requirement statement with a word count of fifty words. Assume that the continuance "following" has a weight of 5, the continuance "below" has a weight of 5, and the maximum allowable score is 100. The continuance analyzer 112 can determine a continuance score of 70 (e.g., 100−5*2/50*100−5*1/50*100=70). Note that continuances may be considered good continuances and assigned a weight of zero, with bad continuances assigned a weight greater than zero.

The option analyzer 114 searches the requirement document 102 for words or phrases that are defined, in the memory 134, as options. Each occurrence of each option can be counted by the option analyzer 114. For each option determined to exist in the requirement document 102, the option analyzer 114 can determine a value to be deducted for the use of that option. For example, the option analyzer 114 can calculate a ratio of: a count of the number of occurrences of the option to a total word count of the requirement document. That ratio may be multiplied by a constant (e.g., one or more of a weight, a maximum allowable score, or a product of the weight and maximum allowable score). For example, if a maximum allowable score is 100, the following can be calculated for each option: weight*ratio*100. The numbers determined for each option may be summed. The result of the sum may be subtracted from the maximum allowable score as a deduction for using problematic options. In formula form (assuming the maximum allowable score is 100):

$$100 - \left( \sum_{option_1}^{option_n} Weight_{option_n} \left( \frac{option_n \text{ count}}{\text{total word count}} \right) * 100 \right)$$

For example, consider a requirement document that includes the options "can" and "may". Assume that the option "can" is counted one time and the option "may" is counted one time in a requirement document with a word count of fifty words. Assume that the option "can" has a weight of 10, the option "may" has a weight of 15, and the maximum allowable score is 100. The option analyzer 114 can determine an option score of 50 (e.g., 100−10*1/50*100−15*1/50*100=50).

The weak phrase analyzer 116 searches the requirement document 102 for words or phrases that are defined, in the memory 134, as weak phrases. Each occurrence of each weak phrase can be counted by the weak phrase analyzer 116. For each weak phrase determined to exist in the requirement document 102, the weak phrase analyzer 116 can determine a value to be deducted for the use of that weak phrase. For example, the weak phrase analyzer 116 can calculate a ratio of: a count of the number of occurrences of the weak phrase to a total word count of the requirement document. That ratio may be multiplied by a constant (e.g., one or more of a weight, a maximum allowable score, or a product of the weight and maximum allowable score). For example, if a maximum allowable score is 100, the following can be calculated for each weak phrase: weight*ratio*100. The numbers determined for each weak phrase may be summed. The result of the sum may be subtracted from the maximum allowable score as a deduction for using confusing weak phrases. In formula form (assuming the maximum allowable score is 100):

$$100 - \left( \sum_{weak\ phrase_1}^{weak\ phrase_n} Weight_{weak\ phrase_n} \left( \frac{weak\ phrase_n \text{ count}}{\text{total word count}} \right) * 100 \right)$$

For example, consider a requirement document that includes the weak phrases "can" and "may". Assume that the weak phrase "can" is counted one time and the weak phrase "may" is counted one time in a requirement document with a word count of fifty words. Assume that the weak phrase "can" has a weight of 30, the weak phrase "may" has a weight of 40, and the maximum allowable score is 100. The weak phrase analyzer 116 can determine a weak phrase score of negative forty (e.g., 100−30*1/50*100−40*1/50*100=−40).

In one or more embodiments, the score produced by any of the analyzers of the system 100 may be limited to a specific range (e.g., between zero and 100, or the like). In such embodiments, the score produced by the respective analyzer may be rounded to the nearest number within the range. For example, the score of negative forty can be rounded up to zero to fit within the allowed range of [100, 0].

The conjunction analyzer 118 searches the requirement document 102 for words or phrases that are defined, in the memory 134, as conjunctions. Each occurrence of each conjunction can be counted by the conjunction analyzer 118. For each conjunction determined to exist in the requirement document 102, the conjunction analyzer 118 can determine a value to be deducted for the use of that conjunction. For example, the conjunction analyzer 118 can calculate a ratio of: a count of the number of sentences that include two or more conjunctions to a total number of sentences of the requirement document. That ratio may be multiplied by a constant (e.g., one or more of a weight, a maximum allowable score, or a product of the weight and maximum allowable score). For example, if a maximum allowable score is 100, the following can be calculated for each sentience that includes two or more conjunctions: weight*ratio*100. The numbers determined for each sentence with two or more conjunctions may be summed. The result of the sum may be subtracted from the maximum allowable score as a deduction for using confusing sentences. In formula form (assuming the maximum allowable score is 100):

$$100 - \left[ \sum_{\textit{multi-conjunction}_1}^{\textit{multi-conjunction}_n} \textit{Weight}_{\textit{multi-conjunction}_n} \left( \frac{\textit{multiconjunction}_n \textit{ sentence count}}{\textit{total sentences}} \right) * 100 \right]$$

For example, consider a requirement document that includes the conjunctions "and" and "but" in one sentence. Assume that a sentence that includes two conjunctions is counted one time in a requirement document with a sentence count of fifty sentences. Assume that sentences with multiple conjunctions have a weight of 30 and the maximum allowable score is 100. The conjunction analyzer 118 can determine a conjunction score of forty (e.g., 100−30*1/50*100=40).

The size and fitness analyzer 120 can determine a number of words in each sentence. The size and fitness analyzer 120 can compare the determined number of words to an acceptable range of sentence sizes as defined in the memory 134. In one or more embodiments, the acceptable range of sentence sizes includes a minimum number of words and a maximum number of words. Below a certain number of words (e.g., four, five, six, or the like) a sentence can become uninformative, and above a certain number of words (e.g., twenty, twenty-five, thirty, a number there between, or the like) a sentence can become confusing. In one or more embodiments, the size and fitness analyzer 120 may deduct a first number of points from a score in response to determining the sentence includes too few words (e.g., a sentence with a number of words less than a specified minimum word threshold). In one or more embodiments, the size and fitness analyzer 120 may deduct a second (same or different from the first) number of points from the score in response to determining the sentence too many words. For example, the first number of points may be 5, 10, 15, 20, or a different number. In another same or different example, the second number of points may be the total number of words in the sentence minus a specified maximum word threshold.

For example, consider a requirement document that includes a minimum word threshold of five and a maximum word threshold of twenty-five. Further assume that the requirement document includes one sentence with three words, one sentence with 42 words, and all other sentences have a word count greater than (or equal to) five and less than (or equal to) 25. Assume that sentences with too few words (a word count less than (or equal to) the specified minimum word threshold) have a deduction of 10, sentences with too many words (a word count greater than (or equal to) the specified maximum word threshold) have a deduction of (number of words in the sentence minus specified maximum word threshold), and the maximum allowable score is 100. The size and fitness analyzer 120 can determine a size and fitness score of seventy-three (e.g., 100−10−(42−25)=73).

The readability analyzer 122 can determine an education grade level (in terms of United States education grades) at which a person may understand the requirement document. The readability analyzer 122 can deduct a number of points from a maximum allowable score for a determined education grade level greater than (or equal to) a specified maximum grade level. For example, the readability analyzer 122 can deduct, from a maximum allowable score, a number of points for each grade level above the specified maximum grade level. In formula form: readability score=maximum allowable score−weight*(determined grade level−maximum grade level). In one or more embodiments, the readability analyzer 122 can determine the education grade level using one or more of a Flesch-Kincaid readability test, automated readability index, ATOS, Coleman-Liau index, Dale-Chall readability, FORCAST, Fry readability formula, Gunning fog index, Lexile, Linsear Write, Raygor readability estimate, SMOG, and Spache readability formula or the like. In one or more embodiments, the determined grade levels can be averaged, such as by using a weighted average, and the average can be used as the grade level for determining a deduction.

The parts of speech circuitry 125 can analyze the requirement document 102 and tag or label words with their respective parts of speech. Part of speech tagging included marking a word in a text (requirement document) as corresponding to a particular part of speech based on a definition of the word and its relationship with other words in the text. Parts of speech tagging can include rule-based and/or stochastic tagging. Existing tools that analyze and label parts of speech exist, and include, for example Apache Open Natural Language Processor (OpenNLP), Viterbi algorithm, the Brill tagger, Constraint Grammar, Python Natural Language ToolKit (NLTK), and the Baum-Welch algorithm, among others. Apache OpenNLP is from Apache Software Foundation of Forest Hill, Md., United States. NLTK was produced by personnel of the University of Pennsylvania and available under an Apache license. The remaining NLP techniques are implemented in a variety of open license and/or consumer products.

The imperative analyzer 108, weak phrase analyzer 116, option analyzer 114, or other analyzer, can consider a part of speech with which the parts of speech circuitry 125 has tagged a word in determining whether to provide a deduction for a word or phrase. For example, consider the word "may". "May" can be considered a weak phrase if tagged, by the parts of speech circuitry 125, as a first part of speech, an imperative if tagged as a second part of speech, or an option if tagged as a third part of speech. The filters 126, 128, 130, 132, 136, 138, and 140 can filter words based on their part of speech, such that the analyzer(s) to which they are connected do not count words that are not to be counted by the analyzer(s). For example, the filter 126 can remove words that are not tagged, by the parts of speech circuitry 125, as being modal. In this way, only words that are used as imperatives may be counted by the imperative analyzer 108. Similarly, one or more of the filters 128 and/or 130 can remove words that are modal. In such embodiments, a requirements document may not be penalized multiple times for the same word or phrase.

Any of the filters 126, 128, 130, 132, 136, 138, and 140 can remove words, numbers, and/or phrases that include less than (or equal to) a threshold number of characters. For example, one or more of the filters 126, 128, 130, 132, 136, 138, and 140 can remove all one character words, such that the size and fitness analyzer 120 does not deduct points from the score for such words. One or more of the filters 126, 128, 130, 132, 136, 138, and 140 can, additionally or alternatively, remove words that include a numeral and a character. For example, "40 A", "150 mpg", or the like, can be filtered out from the words that are counted by the size and fitness analyzer 120 and/or provided to any of the other analyzers of the processing circuitry 104.

The output circuitry 124 can generate a score and/or a report based on data from one or more of the analyzers (e.g., any of the imperative, directive, continuance, option, weak phrase, conjunction, size and fitness, and readability analyzers). A score generated by output circuitry 124 can be a weighted average of the scores provided by the analyzers (e.g., any of the imperative analyzer 108, directive analyzer 110, continuance analyzer 112, option analyzer 114, weak phrase analyzer 116, conjunction analyzer 118, size and fitness analyzer 120, and readability analyzer 122). For example, assume that the following scores are provided by the imperative analyzer 108, directive analyzer 110, continuance analyzer 112, option analyzer 114, weak phrase analyzer 116, conjunction analyzer 118, size and fitness analyzer 120, and readability analyzer 122, respectively: 85, N/A, N/A, 95, 75, 80, 55, and 100. The output circuitry 124 can determine a weighted average of (85+95+75+80+55+100)/6=81.667. Note that not all embodiments allow for a response of N/A. In such embodiments, a maximum allowable score (without deductions) can be used in place of the N/A.

The output circuitry 124 can generate a report, such as can be provided to personnel to help the personnel update and improve the requirement document 102. The report can include an indication of all the words/phrases that resulted in a deduction, and can otherwise provide data indicating which deductions were made. The report can provide a location (e.g., requirement document section, page, line number, or the like) of the word/phrase that led to a deduction. The report can indicate words/phrases, by category. The report can include words/phrases that are detected as being a specific category that did not lead to deductions. Such words/phrases can indicate to a user how to update the requirement document to improve clarity. More details regarding reports are provided in FIG. 2.

FIG. 2 illustrates, by way of example, a diagram of an embodiment of a report 200, such as can be provided by the output circuitry 124 as part of the score/report 106. The report 200 as illustrated includes a requirement document section 102A, an annotated requirement document section 240, and data detailing the words/phrases that lead to deductions in a score for the requirement document section 102A.

The requirement document section 102A can be a sentence, paragraph, or other portion of the requirement document 102 that is delineated, such as by a header, section number, or the like. The requirement document section 102A can include the actual text of the portion of the requirement document 102 that is annotated in the annotated requirement document section 240 and to which the details regarding words/phrases that lead to deductions apply.

The annotated requirement document section 240 can include the text of the requirement document section 102A modified to indicate parts of speech as tagged by the parts of speech circuitry 125. The words/phrases tagged as a first part of speech can be modified (e.g., colored, italicized, bolded, font change, underlined, or the like) in a same manner so as to indicate that the words/phrases are determined to be the first part of speech. The words/phrases tagged as a second part of speech can be modified different from the way in which the words/phrases tagged as the first part of speech, such as to indicate that the words/phrases are determined to be the second part of speech.

The details regarding the words/phrases that lead to deductions in a score as illustrated include a category 242, the word/phrase/grade level/word count 244, a determined count 246, and a deduction 248. The category 242 indicates whether the word/phrase/grade level/word count 244 regards an imperative, directive, continuance, option, weak phrase, conjunction, readability, and/or size and fitness. Generally, the category 242 can indicate the analyzer (see FIG. 1) from which the deduction 248 originated. The word/phrase/grade level/word count 244 indicates a reason for the deduction. In the context of imperatives, directives, conjunctions, continuances, weak phrases, and options the word/phrase/grade level/word count 244 is a word or phrase. In the context of readability, the word/phrase/grade level/word count 244 is a grade level. In the context of size and fitness, the word/phrase/grade level/word count 244 is a number indicating the number of words in a sentence that lead to a deduction.

The count 246 indicates a number of times the word/phrase/grade level/word count 244 appears in the requirement document section 102A. The deduction 248 indicates a total deduction (by the analyzer) for use of the word/phrase/grade level/word count 244. The score 250 indicates the overall score for the requirement document section 102A.

In one or more embodiments, the report 200 can delineate a score provided by each of the analyzers (see FIG. 1). In one or more embodiments, the report can provide scores for each requirement document section 102A that comprise an entire requirement document. The scores can be organized from lowest to highest or highest to lowest, such as to help a user concentrate their efforts on updating the most problematic requirement document section.

FIG. 3 illustrates, by way of example, a diagram of an embodiment of contents of a memory 134. The memory 134 as illustrated includes data including words/phrases 350 and associated categories 352, parts of speech 354, and weight 356. The part of speech 354 indicates a tag required to consider the word/phrase 350 as a member of the category 352. For example, in the embodiment illustrated, if the word "may" is tagged as a "noun" it is neither an imperative nor an option in the embodiment illustrated. If, in the illustrated embodiment, the word "may" is tagged as being modal, the imperative analyzer 108 can count it as an imperative. If, in the illustrated embodiment, the word "may" is not tagged as modal and also not tagged as a noun, then the option analyzer 114 can count it as an option. The weight 356 can be used, by one or more of the analyzers (see FIG. 1) or the output circuitry 124, to determine a deduction for use of the word/phrase 350.

The memory 134 further includes value names 358 and their respective, defined values 360. The value names 358 and associated values 360 define numbers to be used, by one of the analyzers (see FIG. 1) or the output circuitry 124, in determining a score for the requirement document 102 or requirement document section 102A. The value names, as illustrated, include a threshold number of directives, a threshold ratio of continuances to imperatives, a minimum word threshold, a maximum word threshold, a maximum grade level, a maximum allowable score, and a threshold number of conjunctions (per sentence).

Figure 4:
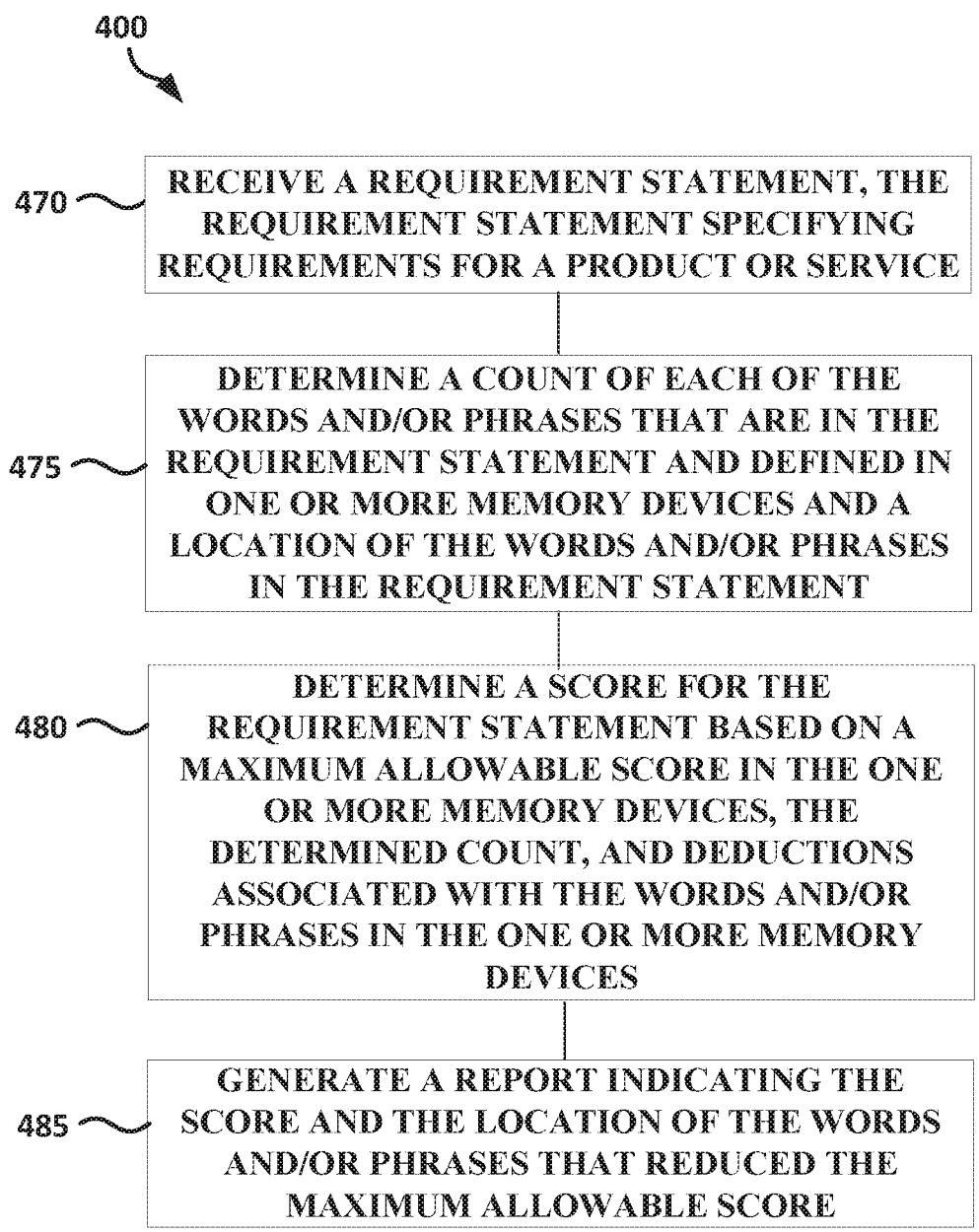
FIG. 4 illustrates, by way of example, a diagram of an embodiment of a method for helping improve clarity of a requirement document or a portion of the requirement document (e.g., one or more requirement statements).

FIG. 4 illustrates, by way of example, a diagram of an embodiment of a method 400 for helping improve clarity of a requirement document 102 or the requirement document section 102A. The method 400, as illustrated, includes: receiving (at the processing circuitry 104), the requirement statement, the requirement statement specifying requirements for a product or service, at operation 470, determining (by the processing circuitry 104), a count of each of the words and/or phrases that are in the requirement statement and defined in one or more memory 134 (coupled to the processing circuitry 104) and a location of the words and/or phrases in the requirement statement, at operation 475; determining (by the processing circuitry 104), a score for the requirement statement based on a maximum allowable score in the one or more memory 134, the determined count, and deductions associated with the words and/or phrases in the one or more memory 134, at operation 480; and generating (by the processing circuitry 104), a report indicating the score and the location of the words and/or phrases that reduced the maximum allowable score.

The method 400 can further include determining requirement statements in a requirement document. The requirement statements can be determined by section headers in the requirement document. For example, it is common for a requirement document to include multiple sections, some of which may include sub-sections. Each of the sub-sections can be considered requirement statements. In another embodiment, a user can be creating the requirement document through a web form and can control what is determined to be a requirement statement through the web form.

The method 400 can further include tagging (by parts of speech circuitry 125) each of the words and/or phrases of the requirement statement with a corresponding part of speech. The method 400 can further include, wherein the one or more memories 134 further include, for each of the words and/or phrases, a corresponding part of speech tag required for a deduction. The operation 475 can further include determining a count of only words and/or phrases that are in the requirement statement that include a part of speech tag that matches the part of speech tag in the one or more memory devices.

The method 400 can further include, wherein the one or more memory devices include a first deduction for a first word of the words and/or phrases that includes a first part of speech tag and a second, different deduction for the first word that includes a second, different part of speech tag. The method 400 can further include in response to determining that a word of the words and/or phrases matches the first word and includes a tag matching the first part of speech tag, reducing the maximum allowable score by the first deduction. The method 400 can further include, in response to determining that another word of the words and/or phrases matches the first word and includes a tag matching the second part of speech tag, reducing the maximum allowable score by the second deduction.

The method 400 can further include determining an education grade level required to understand the requirement statement. The method 400 can further include reducing the maximum allowable score for each grade level greater than (or equal to) a maximum grade level specified in the one or more memories. The operation 475 can further include determining the count by separate categories of words and/or phrases including imperatives, directives, continuances, options, weak phrases, and conjunctions. The method 400 can further include wherein the one or more memories include data defining words and/or phrases in each of the categories and respective deductions for each of the words and/or phrases by category.

The method 400 can further include determining a number of words in each sentence of the requirement statement and for each sentence that includes a number of words greater than a maximum word threshold, reducing the maximum allowable score by an amount specified in the one or more memory devices. The method 400 can further include filtering, from the requirement statement, words with a number of characters less than (or equal to) a specified minimum character threshold and words that include both a numeric and a non-numeric character, before determining the number of words in each sentence. The method 400 can further include determining whether the determined number of words in each sentence of the requirement statement is less than a minimum word threshold and reducing the maximum allowable score by another, different amount specified in the one or more memories. The operation 475 can further include determining a number of sentences in the requirement statement that include two or more conjunctions. The method 400 can further include determining a ratio of a number of continuances to a number of imperatives in the requirement statement and whether the determined ratio is greater than (or equal to) a threshold ratio of continuances to imperatives specified in the one or more memories.

In one or more embodiments, the processing circuitry 104 can update a score and/or report in real-time. The score and/or report can be provided, by a display, speaker, or the like, to a user that is drafting a requirement document. In this way, the drafter can receive real-time feedback regarding the quality and/or ways to improve the requirement document. In one or more embodiments, a user can upload a completed or partially completed requirement document to the processing circuitry 104. The processing circuitry 104 can then produce the score/report 106 and the user can update the requirement document accordingly. The functionality of the processing circuitry 104 and/or other circuitry, such as the parts of speech circuitry, can be implemented in a web application, a local application, or the like.

Figure 5:
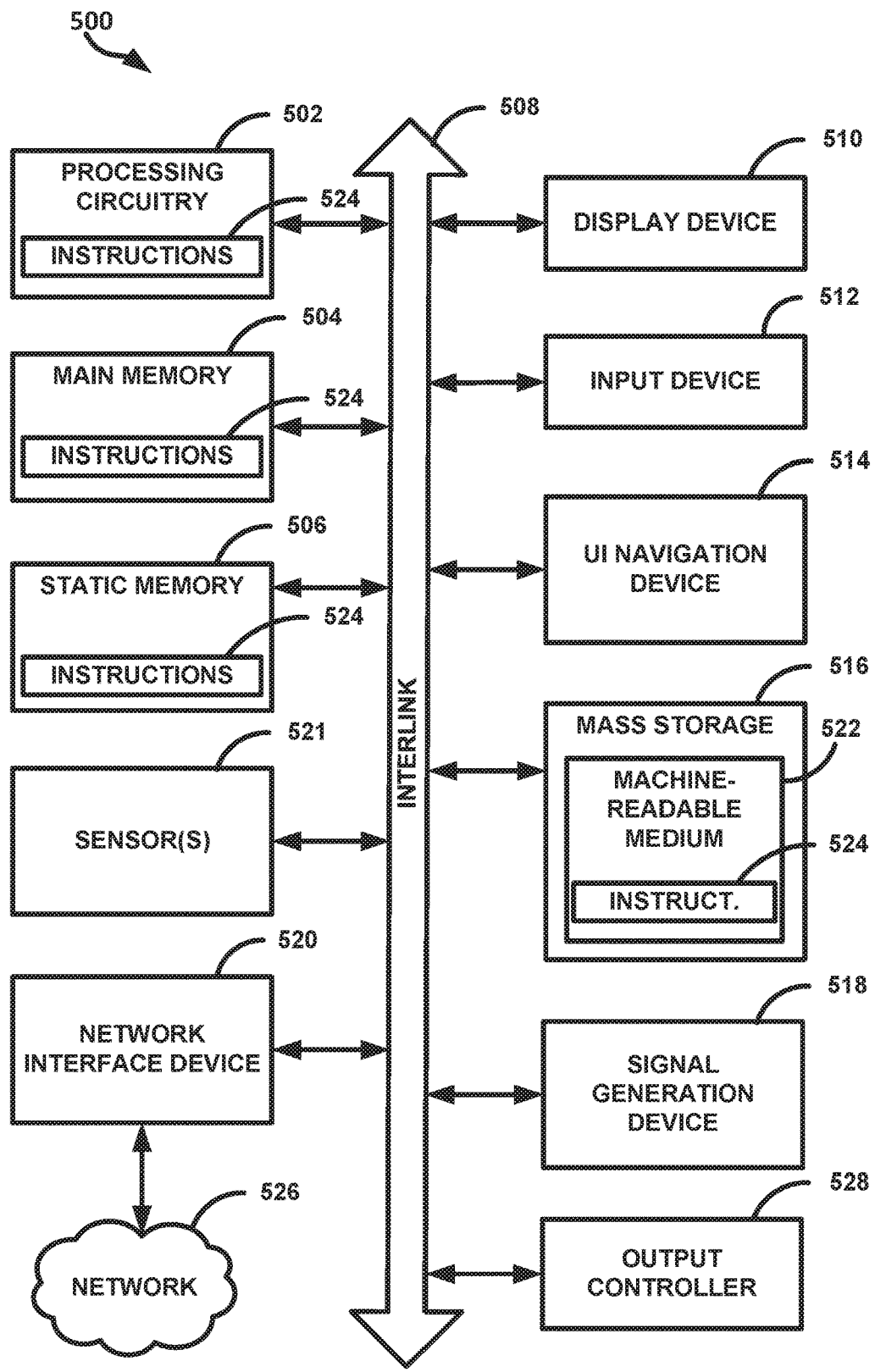
FIG. 5 illustrates, by way of example, a block diagram of an embodiment of a machine on which one or more of the methods, such as those discussed with regard to FIG. 4 and elsewhere herein, can be implemented

FIG. 5 illustrates, by way of example, a block diagram of an embodiment of a machine 500 on which one or more of the methods, such as those discussed with regard to FIG. 4 and elsewhere herein can be implemented. In one or more embodiments, one or more items of the processing circuitry 104 and/or one or more of the imperative analyzer 108, directive analyzer 110, continuance analyzer 112, option analyzer 114, weak phrase analyzer 116, conjunction analyzer 118, size and fitness analyzer 120, readability analyzer 122, output circuitry 124, filter 126, filter 128, filter 130, filter 132, and/or parts of speech circuitry 125 can be implemented by the machine 500. In alternative embodiments, the machine 500 operates as a standalone device or may be connected (e.g., networked) to other machines. In one or more embodiments, the processing circuitry 104 and/or one or more of the imperative analyzer 108, directive analyzer 110, continuance analyzer 112, option analyzer 114, weak phrase analyzer 116, conjunction analyzer 118, size and fitness analyzer 120, readability analyzer 122, output circuitry 124, filter 126, filter 128, filter 130, filter 132, and/or parts of speech circuitry 125 can include one or more of the items of the machine 500. In a networked deployment, the machine 500 may operate in the capacity of a server or a client machine in server-client network environment, or as a peer machine in a peer-to-peer (or distributed) network environment. The machine 500 may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 500 includes processing circuitry 502 (e.g., a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, radios (e.g., transmit or receive radios or transceivers), sensors 521 (e.g., a transducer that converts one form of energy (e.g., light, heat, electrical, mechanical, or other energy) to another form of energy), or the like, or a combination thereof), a main memory 504 and a static memory 506, which communicate with each other via a bus 508. The machine 500 (e.g., computer system) may further include a video display unit 510 (e.g., a liquid crystal display (LCD) or a cathode ray tube (CRT)). The machine 500 also includes an alphanumeric input device 512 (e.g., a keyboard), a user interface (UI) navigation device 514 (e.g., a mouse), a disk drive or mass storage unit 516, a signal generation device 518 (e.g., a speaker) and a network interface device 520. The processing circuitry 104, any of the filters and/or analyzers of the processing circuitry 104, the output circuitry 124, and/or the parts of speech circuitry can include components similar to the processing circuitry 502.

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processing circuitry 502 during execution thereof by the machine 500, the main memory 504 and the processing circuitry 502 also constituting machine-readable media.

The machine 500 as illustrated includes an output controller 528. The output controller 528 manages data flow to/from the machine 500. The output controller 528 is sometimes called a device controller, with software that directly interacts with the output controller 528 being called a device driver.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 620 and any one of several well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Examples and Additional Notes

Example 1 can include a device for locating words and/or phrases in a requirement statement that cause confusion, the device comprising one or more memory devices including data defining words and/or phrases and corresponding, respective deductions for each of the words and/or phrases, and processing circuitry to receive the requirement statement that specifies requirements for a product or service, determine a count of each of the words and/or phrases that are in the requirement statement and the one or more memory devices and a location of the words and/or phrases in the requirement statement, determine a score for the requirement statement based on a maximum allowable score in the one or more memory devices, the determined count, and the deductions, and generate a report indicating the score and the location of the words and/or phrases that reduced the maximum allowable score, the score indicating the quality of the requirement document.

In Example 2, Example 1 can further include parts of speech circuitry to tag each of the words and/or phrases of the requirement statement with a corresponding part of speech, wherein the one or more memory devices further include, for each of the words and/or phrases, a corresponding part of speech tag required for a deduction, and wherein determination of the count includes a count of only words and/or phrases that are in the requirement statement that include a part of speech tag that matches the part of speech tag in the one or more memory devices.

In Example 3, Example 2 can further include, wherein the one or more memory devices include a first deduction for a first word of the words and/or phrases that includes a first part of speech tag and a second, different deduction for the first word that includes a second, different part of speech tag.

In Example 4, at least one of Examples 1-3 can further include, wherein the processing circuitry is further to determine a number of words in each sentence of the requirement statement and for each sentence that includes a number of words greater than a maximum word threshold, reduce the maximum allowable score by an amount specified in the one or more memories.

In Example 5, Example 4 can further include, wherein the processing circuitry is further to filter, from the requirement statement, words with a number of characters less than (or equal to) a specified minimum character threshold and words that include both a numeric and a non-numeric character, before the determination of the number of words in each sentence.

In Example 6, at least one of Examples 4-5 can further include, wherein the processing circuitry is further to determine whether the determined number of words in each sentence of the requirement statement is less than a minimum word threshold and reduce the maximum allowable score by another, different amount specified in the one or more memories.

In Example 7, at least one of Examples 1-6 can further include, wherein the processing circuitry is further to determine an education grade level required to understand the requirement statement and reduce the maximum allowable score for each grade level greater than (or equal to) a maximum grade level specified in the one or more memories.

In Example 8, at least one of Examples 1-7 can further include wherein the determination of the count of each of the words and/or phrases that are in the requirement statement includes the processing circuitry further to determine separate categories of words and/or phrases including imperatives, directives, continuances, options, weak phrases, and conjunctions, and wherein the one or more memories include data defining words and/or phrases in each of the categories and respective deductions for each of the words and/or phrases by category.

In Example 9, Example 8 can further include, wherein the instructions for determination of the count of each of the words and/or phrases in the requirement statement that include conjunctions includes the processing circuitry further to determine a number of sentences in the requirement statement that include two or more conjunctions.

In Example 10, at least one of Examples 8-9 can include the processing circuitry further to determine a ratio of a number of continuances to a number of imperatives in the requirement statement and whether the determined ratio is greater than (or equal to) a threshold ratio of continuances to imperatives specified in the one or more memories.

Example 11 can include a method for determining words and/or phrases that cause confusion in a requirement statement, the method comprising receiving, at processing circuitry of a device, the requirement statement, the requirement statement specifies requirements for a product or service, determining, by the processing circuitry, a count of each of the words and/or phrases that are in the requirement statement and defined in one or more memory devices coupled to the device and a location of the words and/or phrases in the requirement statement, determining, by the processing circuitry, a score for the requirement statement based on a maximum allowable score in the one or more memory devices, the determined count, and deductions associated with the words and/or phrases in the one or more memory devices, and generating, by the processing circuitry, a report indicating the score and the location of the words and/or phrases that reduced the maximum allowable score.

In Example 12, Example 11 can further include tagging, by parts of speech circuitry, each of the words and/or phrases of the requirement statement with a corresponding part of speech, wherein the one or more memory devices further include, for each of the words and/or phrases, a corresponding part of speech tag required for a deduction, and wherein determining the count includes determining a count of only words and/or phrases that are in the requirement statement that include a part of speech tag that matches the part of speech tag in the one or more memory devices.

In Example 13, Example 12 can further include, wherein the one or more memory devices include a first deduction for a first word of the words and/or phrases that includes a first part of speech tag and a second, different deduction for the first word that includes a second, different part of speech tag and the method further comprises in response to determining that a word of the words and/or phrases matches the first word and includes a tag matching the first part of speech tag, reducing the maximum allowable score by the first deduction, and in response to determining that another word of the words and/or phrases matches the first word and includes a tag matching the second part of speech tag, reducing the maximum allowable score by the second deduction.

In Example 14, at least one of Examples 11-13 can further include determining an education grade level required to understand the requirement statement, and reducing the maximum allowable score for each grade level greater than (or equal to) a maximum grade level specified in the one or more memories.

In Example 15, at least one of Examples 11-14 can further include, wherein determining the count of each of the words and/or phrases that are in the requirement statement includes determining the count by separate categories of words and/or phrases including imperatives, directives, continuances, options, weak phrases, and conjunctions, and wherein the one or more memories include data defining words and/or phrases in each of the categories and respective deductions for each of the words and/or phrases by category.

Example 16 can include a non-transitory machine-readable storage device including instructions stored thereon that, when executed by a machine, configure the machine to perform operations for determining words and/or phrases that cause confusion in a requirement statement, the operations comprising receiving the requirement statement, the requirement statement specifies requirements for a product or service, determining a count of each of the words and/or phrases that are in the requirement statement and defined in one or more memory devices and a location of the words and/or phrases in the requirement statement, determining a score for the requirement statement based on a maximum allowable score in the one or more memory devices, the determined count, and deductions associated with the words and/or phrases in the one or more memory devices, and generating a report indicating the score and the location of the words and/or phrases that reduced the maximum allowable score.

In Example 17, Example 16 can further include, wherein the operations further include determining a number of words in each sentence of the requirement statement and for each sentence that includes a number of words greater than a maximum word threshold, reducing the maximum allowable score by an amount specified in the one or more memories.

In Example 18, Example 17 can further include, wherein the operations further include filtering, from the requirement statement, words with a number of characters less than (or equal to) a specified minimum character threshold and words that include both a numeric and a non-numeric character, before determining the number of words in each sentence.

In Example 19, at least one of Examples 17-18 can further include, wherein the operation further include determining whether the determined number of words in each sentence of the requirement statement is less than a minimum word threshold and reducing the maximum allowable score by another, different amount specified in the one or more memories.

In Example 20, at least one of Examples 16-19 can further include, wherein determining the count of each of the words and/or phrases that are in the requirement statement includes determining the count by separate categories of words and/or phrases including imperatives, directives, continuances, options, weak phrases, and conjunctions, and wherein the one or more memories include data defining words and/or phrases in each of the categories and respective deductions for each of the words and/or phrases by category.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device for locating and fixing words and/or phrases in a requirement statement that cause confusion, the device comprising:
   one or more memory devices including data defining the words and/or phrases that cause the confusion and corresponding, respective deductions for each of the words and/or phrases; and
   processing circuitry to:
   receive, through a user interface of the device, the requirement statement that specifies requirements for a product or service;
   determine a count of each of the words and/or phrases that are in the requirement statement and the one or more memory devices and a location of the words and/or phrases in the requirement statement;
   determine a score for the requirement statement based on a maximum allowable score in the one or more memory devices, the determined count, and the respective deductions, wherein the maximum allowable score is reduced by the each of the deductions to determine the score, the words and/or phrases corresponding to at least two of (i) an imperative, (ii) a directive, (iii) a continuance, (iv) an option, (v) a weak phrase, (vi) a conjunction, (vii) a number of words in the requirement statement, or (viii) a readability of the requirement statement; and
   generate (i) a report indicating the score and the location of the words and/or phrases that reduced the maximum allowable score, the score indicating the quality of the requirement document and (ii) an updated requirement statement that indicates locations of words and/or phrases that caused the deductions and reduces the confusion caused by the words and/or phrases that led to the deductions from the maximum allowable score; and
   cause the user interface to provide a view of the updated requirement statement for the user to fix the words and/or phrases that cause confusion.

2. The device of claim 1, further comprising parts of speech circuitry to tag each of the words and/or phrases of the requirement statement with a corresponding part of speech, wherein the one or more memory devices further include, for each of the words and/or phrases, a corresponding part of speech tag required for a deduction, and wherein determination of the count includes a count of only words and/or phrases that are in the requirement statement that include a part of speech tag that matches the part of speech tag in the one or more memory devices.

3. The device of claim 2, wherein the one or more memory devices include a first deduction for a first word of the words and/or phrases that includes a first part of speech tag and a second, different deduction for the first word that includes a second, different part of speech tag.

4. The device of claim 1, wherein the processing circuitry is further to determine a number of words in each sentence of the requirement statement and for each sentence that includes a number of words greater than a maximum word threshold, reduce the maximum allowable score by an amount specified in the one or more memory devices.

5. The device of claim 4, wherein the processing circuitry is further to filter, from the requirement statement, words with a number of characters less than (or equal to) a specified minimum character threshold and words that include both a numeric and a non-numeric character, before the determination of the number of words in each sentence.

6. The device of claim 4, wherein the processing circuitry is further to determine whether the determined number of words in each sentence of the requirement statement is less than a minimum word threshold and reduce the maximum allowable score by another, different amount specified in the one or more memories.

7. The device of claim 1, wherein the processing circuitry is further to determine an education grade level required to understand the requirement statement and reduce the maximum allowable score for each grade level greater than (or equal to) a maximum grade level specified in the one or more memories.

8. The device of claim 1, wherein the determination of the count of each of the words and/or phrases that are in the requirement statement include the processing circuitry further to determine separate categories of words and/or phrases including imperatives, directives, continuances, options, weak phrases, and conjunctions, and wherein the one or more memories include data defining words and/or phrases in each of the categories and respective deductions for each of the words and/or phrases by category.

9. The device of claim 8, wherein the determination of the count of each of the words and/or phrases in the requirement statement that include conjunctions include the processing circuitry to determine a number of sentences in the requirement statement that include two or more conjunctions.

10. The device of claim 8, wherein the processing circuitry is further to determine a ratio of a number of continuances to a number of imperatives in the requirement statement and whether the determined ratio is greater than (or equal to) a threshold ratio of continuances to imperatives specified in the one or more memories.

11. A method for locating and fixing words and/or phrases that cause confusion in a requirement statement, the method comprising:
   receiving, at processing circuitry of a device, the requirement statement, the requirement statement specifies requirements for a product or service;
   determining, by the processing circuitry, a count of each of the words and/or phrases that are in the requirement statement and defined in one or more memory devices coupled to the device and a location of the words and/or phrases in the requirement statement;
   determining, by the processing circuitry, a score for the requirement statement based on a maximum allowable score in one or more memory devices, the determined count, and respective deductions associated with the words and/or phrases in the one or more memory devices, wherein the maximum allowable score is reduced by the each of the deductions to determine the score, the words and/or phrases corresponding to at least two of (i) an imperative, (ii) a directive, (iii) a continuance, (iv) an option, (v) a weak phrase, (vi) a conjunction, (vii) a number of words in the requirement statement, or (viii) a readability of the requirement statement;
   generating, by the processing circuitry, (i) a report indicating the score and the location of the words and/or phrases that reduced the maximum allowable score and (ii) an updated requirement statement that indicates locations of words and/or phrases that caused the deductions and reduces the confusion caused by the words and/or phrases that led to the deductions from the maximum allowable score; and causing a user interface to provide a view of the updated requirement statement for a user to fix the words and/or phrases that cause confusion.

12. The method of claim 11, further comprising tagging, by parts of speech circuitry, each of the words and/or phrases of the requirement statement with a corresponding part of speech, wherein the one or more memory devices further include, for each of the words and/or phrases, a corresponding part of speech tag required for a deduction, and wherein determining the count includes determining a count of only words and/or phrases that are in the requirement statement that include a part of speech tag that matches the part of speech tag in the one or more memory devices.

13. The method of claim 12, wherein the one or more memory devices include a first deduction for a first word of the words and/or phrases that includes a first part of speech tag and a second, different deduction for the first word that includes a second, different part of speech tag and the method further comprises:

in response to determining that a word of the words and/or phrases matches the first word and includes a tag matching the first part of speech tag, reducing the maximum allowable score by the first deduction; and in response to determining that another word of the words and/or phrases matches the first word and includes a tag matching the second part of speech tag, reducing the maximum allowable score by the second deduction.

14. The method of claim 11, further comprising:

determining an education grade level required to understand the requirement statement; and reducing the maximum allowable score for each grade level greater than (or equal to) a maximum grade level specified in the one or more memories.

15. The method of claim 11, wherein determining the count of each of the words and/or phrases that are in the requirement statement includes determining the count by separate categories of words and/or phrases including imperatives, directives, continuances, options, weak phrases, and conjunctions, and wherein the one or more memories include data defining words and/or phrases in each of the categories and respective deductions for each of the words and/or phrases by category.

16. A non-transitory machine-readable storage device including instructions stored thereon that, when executed by a machine, configure the machine to perform operations for determining words and/or phrases that cause confusion in a requirement statement, the operations comprising:

receiving the requirement statement, the requirement statement specifies requirements for a product or service;

determining a count of each of the words and/or phrases that are in the requirement statement and defined in one or more memory devices and a location of the words and/or phrases in the requirement statement;

determining a score for the requirement statement based on a maximum allowable score in the one or more memory devices, the determined count, and respective deductions associated with the words and/or phrases in the one or more memory devices, wherein the maximum allowable score is reduced by the each of the deductions to determine the score, the words and/or phrases corresponding to at least two of (i) an imperative, (ii) a directive, (iii) a continuance, (iv) an option, (v) a weak phrase, (vi) a conjunction, (vii) a number of words in the requirement statement, or (viii) a readability of the requirement statement;

generating (i) a report indicating the score and the location of the words and/or phrases that reduced the maximum allowable score and (ii) an updated requirement statement that indicates locations of words and/or phrases that caused the deductions and reduces the confusion caused by the words and/or phrases that led to the deductions from the maximum allowable score; and causing a user interface to provide a view of the updated requirement statement for a user to fix the words and/or phrases that cause confusion.

17. The non-transitory machine-readable storage device of claim 16, wherein the operations further include determining a number of words in each sentence of the requirement statement and for each sentence that includes a number of words greater than a maximum word threshold, reducing the maximum allowable score by an amount specified in the one or more memories.

18. The non-transitory machine-readable storage device of claim 17, wherein the operations further include filtering, from the requirement statement, words with a number of characters less than (or equal to) a specified minimum character threshold and words that include both a numeric and a non-numeric character, before determining the number of words in each sentence.

19. The non-transitory machine-readable storage device of claim 17, wherein the operations further include determining whether the determined number of words in each sentence of the requirement statement is less than a minimum word threshold and reducing the maximum allowable score by another, different amount specified in the one or more memories.

20. The non-transitory machine-readable storage device of claim 16, wherein determining the count of each of the words and/or phrases that are in the requirement statement includes determining the count by separate categories of words and/or phrases including imperatives, directives, continuances, options, weak phrases, and conjunctions, and wherein the one or more memories include data defining words and/or phrases in each of the categories and respective deductions for each of the words and/or phrases by category.

* * * * *